United States Patent [19]
Bolton et al.

[11] Patent Number: 5,761,636
[45] Date of Patent: Jun. 2, 1998

[54] BIT ALLOCATION METHOD FOR IMPROVED AUDIO QUALITY PERCEPTION USING PSYCHOACOUSTIC PARAMETERS

[75] Inventors: Scott Charles Bolton, Arlington Heights; James Leonard Fiocca, Palatine, both of Ill.

[73] Assignee: Motorola, Inc., Schaumburg, Ill.

[21] Appl. No.: 798,013

[22] Filed: Feb. 12, 1997

Related U.S. Application Data

[63] Continuation of Ser. No. 207,995, Mar. 9, 1994, abandoned.
[51] Int. Cl.[6] .................................................. G10L 3/02
[52] U.S. Cl. ........................................ 704/229; 704/230
[58] Field of Search ................................ 395/2.38, 2.39

[56] References Cited

U.S. PATENT DOCUMENTS

| | | | |
|---|---|---|---|
| 4,048,443 | 9/1977 | Crochiere et al. | 395/2.15 |
| 4,899,384 | 2/1990 | Crouse et al. | 395/2.38 |
| 4,912,763 | 3/1990 | Galand et al. | 395/2.39 |
| 4,956,871 | 9/1990 | Swaminathan | 381/31 |
| 5,018,199 | 5/1991 | Nakagima et al. | 395/2.38 |
| 5,222,189 | 6/1993 | Fielder | 395/2 |
| 5,285,498 | 2/1994 | Johnston | 381/2 |
| 5,375,189 | 12/1994 | Tsutsui | 395/2.38 |

OTHER PUBLICATIONS

Teh, D. H. et al., *Subband Coding of High–Fidelity Quality Audio Signals at 128 kbps*, Sep., 1992, ICASS p–92, pp. II 197 to II 200.

Veldhuis, R. N. J. et al., *Subband Coding of Digital Audio Signals Without Loss of Quality*, Feb., 1989, IEEE, pp. 2009–2012.

Veldhuis, R. N. J., *Bit Rates in Audio Source Coding*, Jan. 1992, IEEE Journ. of Select Areas of Comm., vol. 10, No. 1, pp. 86–96.

Johnston, J. D., *Transform Coding of Audio Signals Using Perceptual Noise Criteria*, Feb., 1988, IEEE Journ. of Select Areas of Comm., vol. 6, No. 2, pp. 314–323.

Jayant, N. et al., *Signal Compression Based on Models of Human Perception*, Oct., 1992, Proceedings of IEEE, vol. 81, No. 10, pp. 1385–1422.

Esteban et al., ("Application of Quadrature Mirror Filters to Split Band Voice Coding Schemes", IEEE ICASSP'77, pp. 191–195) Jan. 1977.

International Standards Organization International Electrotechnical Committee (ISO/IEC) 11172–3 Draft International Standard, "Coding of Moving Pictures And Associated Audio For Digital Storage Media At Up To 1.5 Mbits/s", Nov. 24, 1992, pp. 2, C–5–C–12, B–2–B–5, B–9.

*Primary Examiner*—Allen R. MacDonald
*Assistant Examiner*—Vijay B. Chawan
*Attorney, Agent, or Firm*—Darleen J. Stockley

[57] ABSTRACT

Audio quality perception can be improved in an audio compression system 100 by defining a frequency subband threshold 205. With the frequency subband threshold 205, each frequency subband favorable to the threshold will be allocated at least a predetermined number of bits while frequency subbands unfavorable to the threshold will receive no bit allocations. This determination is made on an audio frame by audio frame basis, or upon change of the audio compression ratio, since changing any of the parameters: bitrate, sampling rate and coding mode changes the compression ratio.

6 Claims, 3 Drawing Sheets

| BITRATE (kbps) | $f_s$ = 44.1kHz | | $f_s$ = 48kHz | | $f_s$ = 32kHz | |
| --- | --- | --- | --- | --- | --- | --- |
| | STEREO | MONO | STEREO | MONO | STEREO | MONO |
| 448 | -1 | -1 | -1 | -1 | -1 | -1 |
| 416 | -1 | -1 | -1 | -1 | -1 | -1 |
| 384 | -1 | -1 | -1 | -1 | -1 | -1 |
| 352 | -1 | -1 | -1 | -1 | -1 | -1 |
| 320 | -1 | -1 | -1 | -1 | -1 | -1 |
| 288 | -1 | -1 | -1 | -1 | -1 | -1 |
| 256 | 28 | -1 | 24 | -1 | 31 | -1 |
| 224 | 22 | -1 | 20 | -1 | 31 | -1 |
| 192 | 18 | -1 | 16 | -1 | 28 | -1 |
| 160 | 14 | -1 | 12 | -1 | 23 | -1 |
| 128 | 11 | 26 | 9 | 22 | 17 | -1 |
| 96 | 7 | 18 | 6 | 15 | 12 | 24 |
| 64 | 3 | 10 | 2 | 8 | 6 | 13 |
| 32 | N/A | 2 | N/A | 2 | N/A | 6 |

FIG.4

BIT ALLOCATION METHOD FOR IMPROVED AUDIO QUALITY PERCEPTION USING PSYCHOACOUSTIC PARAMETERS

This is a continuation of application Ser. No. 08/207,995, filed Mar. 9, 1994 and now abandoned.

FIELD OF THE INVENTION

This invention relates generally to the field of audio compression, and, in particular, to improved audio quality perception.

BACKGROUND OF THE INVENTION

Communication systems are known to include a plurality of communication devices and communication channels, which provide the communication medium for the communication devices. To increase the efficiency of the communication system, audio that needs to be communicated is digitally compressed. The digital compression reduces the number of bits needed to represent the audio while maintaining perceptual quality of the audio. The reduction in bits allows more efficient use of channel bandwidth and reduces storage requirements. To achieve audio compression, each communication device may include an encoder and a decoder. The encoder allows the communication device to compress audio before transmission over a communication channel. The decoder enables the communication device to receive compressed audio from a communication channel and render it audible. Communication devices that may use digital audio compression include high definition television transmitters and receivers, cable television transmitters and receivers, portable radios, and cellular telephones.

One type of audio encoder has a fixed target bit rate for the compressed audio information. The target bit rate is fixed by the desired storage media, the desired communication channel, and/or the desired level of audio quality at the decoder. Since the target bit rate is fixed, the number of bits available to an audio frame is also fixed. Another type of audio encoder is a subband encoder. Subband encoders divide the frequency spectrum of the signal to be encoded into several distinct subbands. The magnitude of the signal in a particular subband may be used in compressing the signal.

An exemplary prior art fixed-bit rate subband audio encoder is the International Standards Organization International Electrotechnical Committee (ISO/IEC) 11172-3 international standard, hereinafter referred to as MPEG (Moving Picture Experts Group) audio. MPEG audio allows bits to be assigned to each subband within an audio frame. On a frame by frame basis, the number of subbands that actually are allocated bits varies. This variation in bit allocations may produce an audible artifact similar to a chirp. One method for eliminating the audible artifact is to allocate a sufficient number of bits to each subband. While this approach works well for high bit rates, for low bit rates, this is impossible.

Therefore, a need exists for a method and apparatus that eliminates the audio artifact in fixed-bit rate subband audio compression systems such as MPEG audio.

BRIEF DESCRIPTION OF THE DRAWINGS

FIG. 4 illustrates preferred frequency subband thresholds for corresponding output bit rates and input sampling rates for use in accordance with the present invention.

DESCRIPTION OF A PREFERRED EMBODIMENT

Generally the present invention provides a method and apparatus that improves audio quality perception. This is accomplished by determining a set of frequency subbands. This set of frequency subbands is a subset of the subbands available in an audio frame. For each audio frame, bits are allocated to the frequency subbands in the set based on psychoacoustic parameters. During the bit allocation process, the process ensures that at least a predetermined number of bits are allocated to each frequency subband in the set of frequency subbands. With such a method and apparatus, the audio artifacts of the prior art are substantially eliminated thus producing improved audio quality perception.

Figure 1:
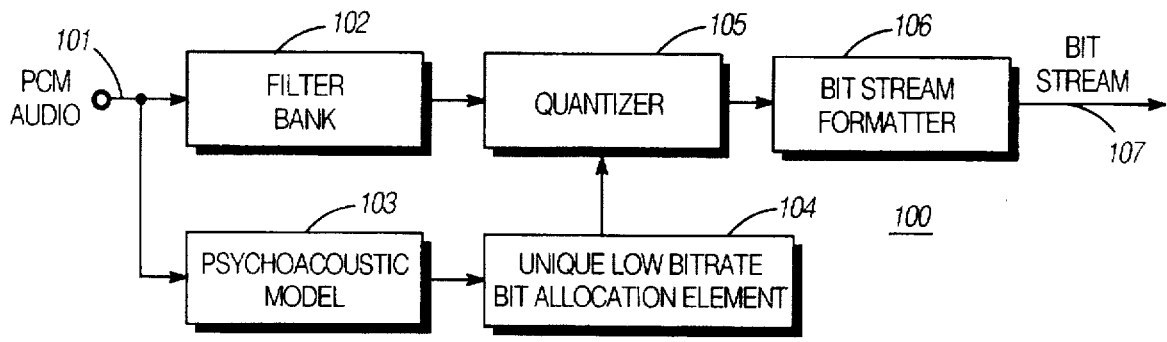
FIG. 1 illustrates an audio compression system that incorporates the present invention.

The present invention can be more fully described with reference to FIGS. 1–4. FIG. 1 illustrates an audio compression system 100 that receives an audio frame, such as a frame of pulse code modulated (PCM) audio 101. The frame of PCM audio 101 is analyzed by a filterbank 102 and a psychoacoustic model 103. The filterbank 102 outputs a frequency domain representation of the frame of audio for several frequency subbands. The psychoacoustic model 103 determines in conjunction with the bit allocation element 104, the number of bits that should be allocated to each frequency subband based on the perception of the human ear. Each bit is iteratively allocated and the psychoacoustic parameters are re-analyzed after each iteration. The final bit allocation is outputted to the quantizer 105 by the bit allocation element 104. The quantizer 105 compresses the output of the filterbank 102 to correspond to the final bit allocation. The bit stream formatter 106 takes the compressed audio from the quantizer and adds any header or additional information and formats it into a bit stream 107.

The PCM audio 101 is typically a linearly quantized representation of an audio signal. The sample size varies depending on the requirements of the application, typically in the range of 8 to 24 bits. Compact discs and digital audio tape use 16 bits. The sampling frequency also varies, typically in the range of 8 to 48 kHz. Compact discs use 44.1 kHz. In addition, multiple channels may be interleaved in the PCM audio signal. Compact disks and digital audio tapes use two channels. So for an example compact disc-based audio compression system, the input PCM audio is 16 bits per sample, 44.1 kHz sampling frequency, and two channels. This yields an input bit rate of about 1.5 megabits per second.

The filterbank 102 which may be implemented in accordance with MPEG audio by a digital signal processor such as the MOTOROLA DSP56002, transforms the input time domain audio samples into a frequency domain representation. Filterbank 102 uses a small number (2–32) of linear frequency divisions of the original audio spectrum to represent the audio signal. The filterbank 102 outputs the same number of samples that were input and is therefore said to critically sample the signal. The filterbank 102 critically samples and outputs N subband samples for every N input time domain samples.

The psychoacoustic model 103, which may be implemented in accordance with MPEG audio by a digital signal processor such as the MOTOROLA DSP56002, analyzes the signal strength and masking level in each of the frequency subbands. It outputs a signal-to-mask ratio (SMR) value for each subband. The SMR value represents the relative sensitivity of the human ear to that subband for the given analyzed period. The higher the SMR, the more sensitive the human ear is to noise in that subband, and consequently, more bits should be allocated to it. Compression is achieved by allocating fewer bits to the subbands with the lower SMR, to which the human ear is less sensitive.

The bit allocation element 104, which may be implemented with a digital signal processor such as the MOTOROLA DSP56002, uses the SMR information from the psychoacoustic model 103, the desired compression ratio, and other bit allocation parameters to generate a complete table of bit allocation per subband. The function of the bit allocation element 104, will be described below with reference to FIG. 3.

The quantizer 105, which may be implemented in accordance with MPEG audio by a digital signal processor such as the MOTOROLA DSP56002, uses the bit allocation information to scale and quantize the subband samples to the specified number of bits. Various types of scaling may be used prior to quantization to minimize the information lost by quantization. The final quantization is typically achieved by processing the scaled subband sample through a linear quantization equation, and then truncating the [m-n] least significant bits from the result, where m is the initial number of bits, and n is the number of bits allocated for that subband.

The bit stream formatter 106 which may be implemented in accordance with MPEG audio by a digital signal processor such as the MOTOROLA DSP56002, takes the quantized subband samples from the quantizer 105 and packs them on to the bit stream 107 along with header information, bit allocation information, scale factor information, and any other side information the coder requires. The bit stream is output at a rate equal to the PCM audio 101 input bit rate divided by the compression ratio.

Figure 2:
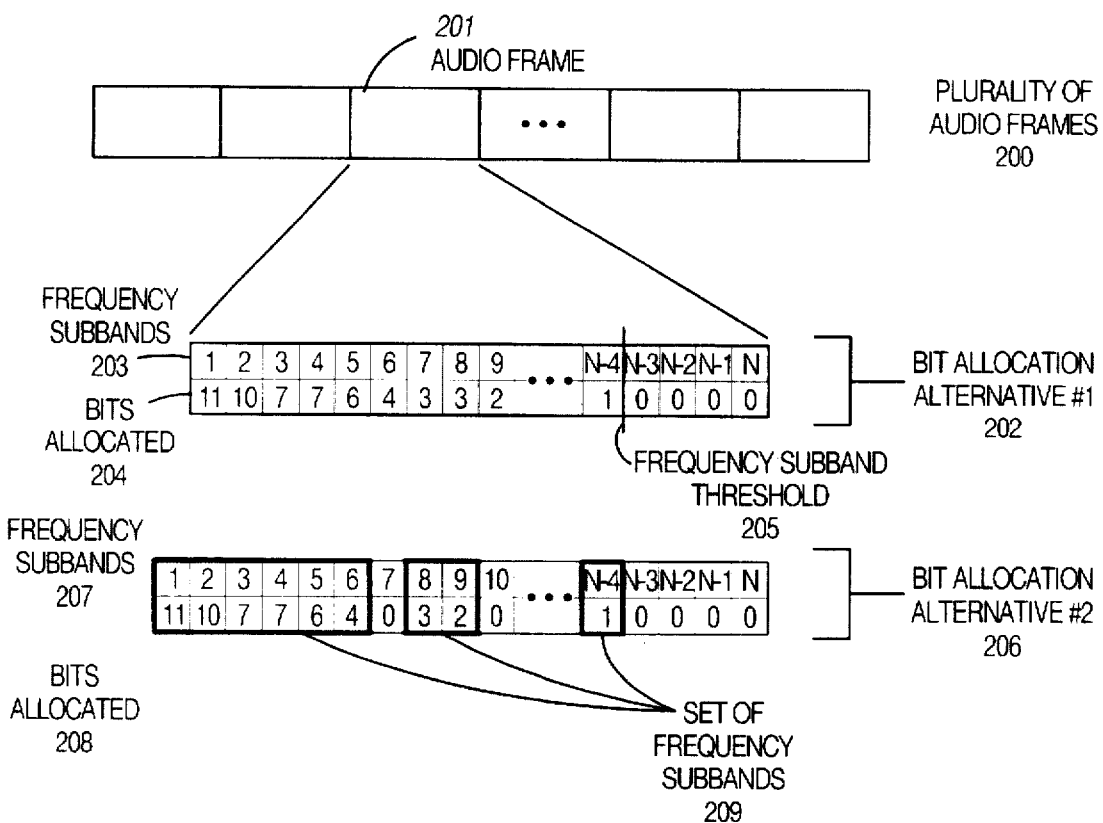
FIG. 2 illustrates an exemplary bit allocation process in accordance with the present invention.

The present invention eliminates the audio artifact by determining either a frequency subband threshold, or a set of frequency subbands. As illustrated in FIG. 2, the audio compression system 100 receives a plurality of audio frames 200. Each audio frame 201 includes a plurality of frequency subbands 203, 207. Each of the frequency subbands has a corresponding number of allocated bits 204, 208. As shown in allocation alternative #1 202, the frequency subband threshold 205 is utilized. In this alternative 202, frequency subbands favorable to, or below, the frequency subband threshold 205 are allocated bits while frequency subbands above the threshold are not. To ensure elimination of the audio artifact, each frequency subband below the frequency threshold 205 must have at least a predetermined number of bits allocated to it. This predetermined number of bits may be one or any other number that the system can support. The process in which the bits are allocated to the frequency subbands will be described with reference to FIG. 3 below.

FIG. 2 also illustrates an alternative bit allocation 206, which shows a set of frequency subbands 209. In this alternative 206, each frequency subband in the set of frequency subbands 209 are allocated at least a predetermined number of bits. Note that the set of frequency subbands can be a contiguous set or a non contiguous set as shown in FIG. 2. Again, the bit allocation will be described with reference to FIG. 3.

Figure 3:
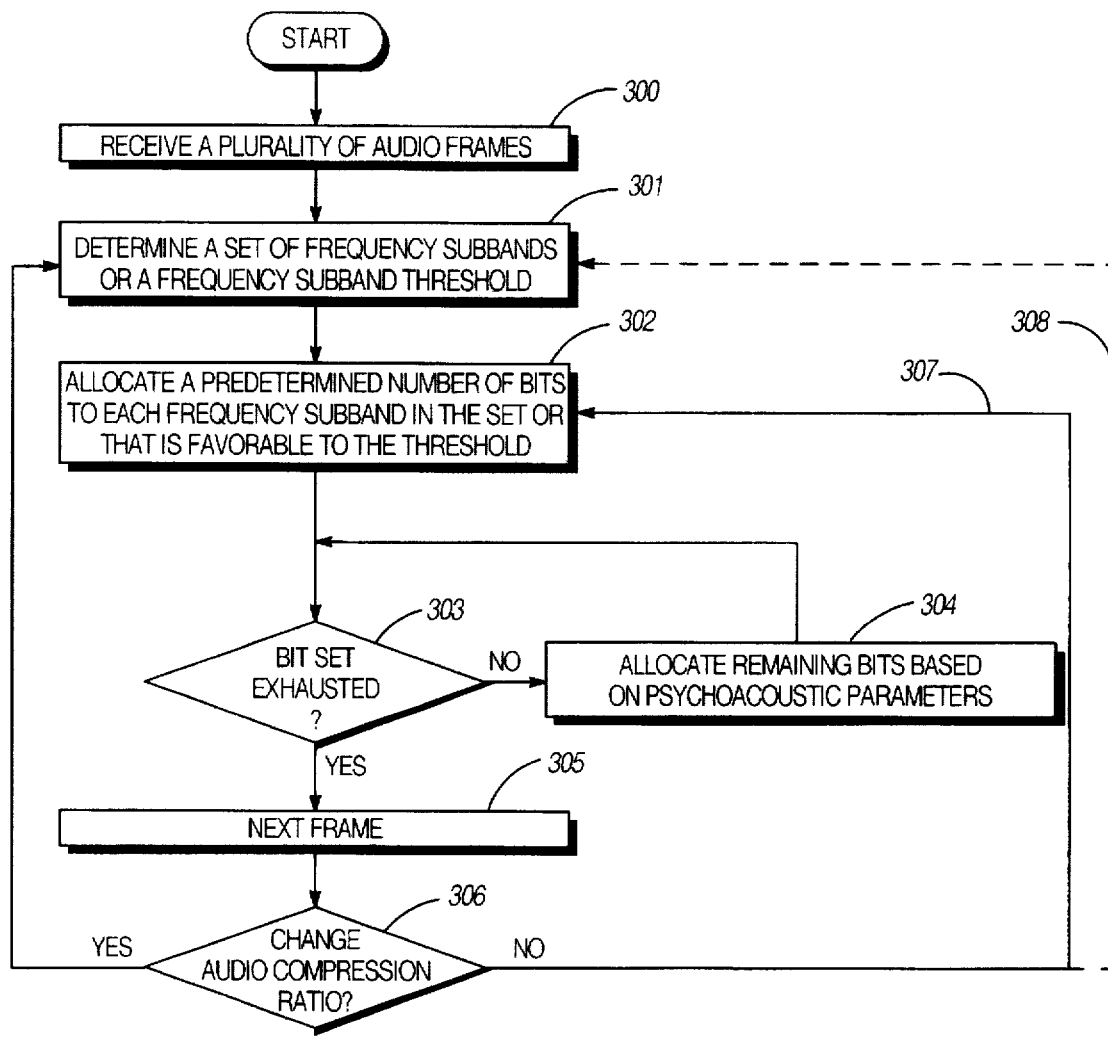
FIG. 3 illustrates a flow diagram of a method that may be used to implement the present invention.

FIG. 3 illustrates a flow diagram that may be used by the audio compression system 100 to implement the present invention. At step 300, the audio compression system receives a plurality of audio frames. As described above, each audio frame in the plurality of audio frames, could be PCM audio, and includes a plurality of frequency subbands. Typically, in MPEG audio each audio frame includes 32 frequency subbands. However, in different applications, the number of frequency subbands may vary.

Depending upon whether bit allocation alternative #1 202 or bit allocation alternative #2 206 is used, the process either determines a set of frequency subbands or a frequency subband threshold 301. When using alternative #1 202, the set of frequency subbands is based on the selected audio compression ratio. The audio compression ratio is based on an input sampling rate of each audio frame and an output bit rate of the audio compression system. As examples of the input sampling rate and output bit rate, an audio compression system's sampling rate may be from 8 to 48 kHz while the output bit rate may be 32 to 448 kilobits per second. As described above, the higher the bit rate, the more bits are available for bit allocation. Thus, the fewer the bits available for allocation, the smaller the set of frequency subbands or the lower the frequency subband threshold is set. Note that the subbands are typically sequentially numbered and the frequency subband threshold is typically chosen to be a numerical representation such that frequencies subbands below that number are included while frequencies above that number are excluded. For example, if a compression ratio of 8 to 1 is selected, the subband threshold will be at frequency subband 16. Thus frequency subbands 1–16 will be allocated bits while frequency subbands 17–32 will not be allocated bits.

Having set the frequency subband threshold or having determined the set of frequency subbands, a predetermined number of bits are allocated to each frequency subband in the set or that is favorable to the frequency subband threshold 302. As mentioned above, the predetermined number of bits may be one or any number that the system can readily sustain. With an initial bit allocation, the audio compression system then determines whether all the bits in a bit set have been exhausted 303. When bits are remaining to be allocated within the bit set 303, the remaining bits are allocated, on a bit by bit basis to subbands in the set or to subbands favorable to the subband threshold, based on psychoacoustic parameters of the audio frame 304. This process repeats until the bit set is exhausted 303.

Having exhausted the bit set, the audio compression system then goes to the next frame 305 and subsequently determines whether a change in audio compression ratio has occurred 306. If a change in audio compression ratio has occurred, the process repeats at step 301. Continuing with the example above, where a compression ratio of 8 to 1 was selected, if the compression ratio were changed to 12 to 1, the frequency subband threshold would be 9 such that frequency subbands 1–9 would be allocated bits while frequency subbands 10–32 would receive no bit allocations.

If no change in audio compression ratio has occurred 306, the process may proceed in one of two directions. If path 307 is chosen, the process repeats at step 302. However, if path 308 is chosen, the set of frequency subbands or frequency subband threshold is again determined. If this path 308 is chosen, the set of frequency subbands or the frequency subband threshold is being determined on a frame by frame basis. When this path is chosen, the frame by frame basis may change from using the set in one frame to the threshold in another frame, and vise versa.

FIG. 4 illustrates a table of corresponding output bit rates 400 and input sampling rates 401. For each input sampling rate 401, a stereo column 403 and a mono column 404 are shown. The stereo column 403 indicates that the audio input includes a left and right channel. The mono column 404 indicates that the audio input has a single channel. For each column of input sampling rate and corresponding bit rate, a number is shown indicating either the number of frequency subbands in the set of frequency subbands, or the frequency subband threshold 402. As shown in the table, at times, the set or frequency threshold 402 is shown to be a minus 1. In this instance, the present invention is not needed, in that, the output bit rate is sufficiently high to eliminate the audio artifact. When the set or frequency subband threshold 402 is not a minus 1, the number is representative of the subbands either within the set, or of the frequency subband threshold.

The present invention provides a method and apparatus for improving audio quality perception. With such a method, the audio artifact produced in prior art systems which resulted from a varying number of frequency subbands receiving bit allocation, has been eliminated. With the elimination of the audio artifact, the audio quality as perceived by humans is enhanced.

We claim:

1. A method for bit allocation that improves audio quality perception in an audio compression system, wherein the audio compression system receives a plurality of audio frames, and wherein each audio frame of the plurality of audio frames includes a plurality of frequency subbands, the method comprising the steps of:
   a) determining a set of frequency subbands from the plurality of frequency subbands based on a selected audio compression ratio, wherein the set of frequency subbands is a subset of the plurality of subbands; and
   b) for each audio frame of the plurality of audio frames, allocating, based on psychoacoustic parameters of the each audio frame, bits of a bit set to frequency subbands in the set of frequency subbands until the bit set is exhausted, wherein at least a predetermined number of bits is allocated to each frequency subband in the set of frequency subbands wherein step (a) further comprises:
      defining the selected audio compression ratio to be a function of an input sampling rate of each audio frame of the plurality of audio frames and an output bit rate of the audio compression system;
      determining the set of frequency subbands on a frame by frame basis; and
      determining the set of frequency subbands when the selected audio compression ratio changes,
      wherein each frequency subband within a predetermined frequency subband threshold is allocated at least a predetermined number of bits and frequency subbands not within to the predetermined frequency subband threshold fail to receive bit allocations.

2. In the method of claim 1, step (b) further comprises defining the predetermined number of bits to be one.

3. In the method of claim 1, step (a) further comprises defining the set of frequency subbands to be a contiguous subset of the plurality of frequency subbands.

4. A method for bit allocation that improves audio quality perception in an audio compression system, wherein the audio compression system receives a plurality of audio frames, wherein each audio frame of the plurality of audio frames includes a plurality of frequency subbands, and wherein the plurality of frequency subbands is sequentially numbered, the method comprising the steps of:
   a) determining a frequency subband threshold based on a selected audio compression ratio; and
   b) for each audio frame of the plurality of audio frames, allocating, based on psychoacoustic parameters of the each audio frame, bits of a bit set to frequency subbands of the plurality of frequency subbands having a sequential number favorable to the frequency subband threshold until the bit set is exhausted, wherein at least a predetermined number of bits is allocated to each frequency subband of the plurality of frequency subbands having a sequential number favorable to the frequency subband threshold wherein step (a) further comprises:
      defining the selected audio compression ratio to be a function of an input sampling rate of each audio frame of the plurality of audio frames and an output bit rate of the audio compression system;
      determining the frequency subband threshold on a frame by frame basis; and
      determining the frequency subband threshold when the selected audio compression ratio changes,
      wherein each frequency subband within a predetermined frequency subband threshold is allocated at least a predetermined number of bits and frequency subbands not within to the predetermined frequency subband threshold fail to receive bit allocations.

5. In the method of claim 4, step (b) further comprises defining the predetermined number of bits to be one.

6. An audio compression system that receives an audio frame of a plurality of audio frames, wherein the audio frame includes a plurality of frequency subbands, the audio compression system comprises:
   a filterbank that receives the audio frame;
   a psychoacoustic model that receives the audio frame, wherein the psychoacoustic model determines psychoacoustic parameters of the audio frame;
   a quantizer that is operably coupled to the filterbank, wherein the quantizer compresses the audio frame based on bit allocation information; and
   a bit allocation element that is operably coupled to the psychoacoustic model, wherein the bit allocation element provides the bit allocation information to the quantizer, and wherein the bit allocation element:
      a) determines a set of frequency subbands from the plurality of frequency subbands based on a selected audio compression ratio, wherein the set of frequency subbands is a subset of the plurality of frequency subbands, defines the selected audio compression ratio to be a function of an input sampling rate of each audio frame of the plurality of audio frames and an output bit rate of the audio compression system, determines the set of frequency subbands on a frame by frame basis; and determines the set of frequency subbands when the selected audio compression ratio changes; and
      b) for each audio frame of the plurality of audio frames, allocates, based on psychoacoustic parameters of the each audio frame, bits of a bit set to frequency subbands in the set of frequency subbands until the bit set is exhausted, wherein at least a predetermined number of bits is allocated to each frequency subband in the set of frequency subbands,
   wherein each frequency subband within a predetermined frequency subband threshold is allocated at least a predetermined number of bits and frequency subbands not within to the predetermined frequency subband threshold fail to receive bit allocations.

* * * * *